United States Patent [19]

Wikoff

[11] 4,215,451
[45] Aug. 5, 1980

[54] DEHIDER

[75] Inventor: Mark W. Wikoff, Montgomery, Ohio

[73] Assignee: Best & Donovan, Cincinnati, Ohio

[21] Appl. No.: 38,008

[22] Filed: May 10, 1979

[51] Int. Cl.³ .............................................. A22B 5/16
[52] U.S. Cl. .......................................... 17/21; 30/206
[58] Field of Search ...................... 17/21; 30/205, 206, 30/215, 216

[56] References Cited

U.S. PATENT DOCUMENTS

| 1,506,510 | 8/1924 | Thuau | 17/21 |
| 2,547,134 | 4/1951 | McLean | 17/21 |
| 3,165,833 | 1/1965 | Logan | 30/206 |
| 3,277,572 | 10/1966 | Eickenberg | 30/206 |

FOREIGN PATENT DOCUMENTS 549411 11/1957 Canada ........................................ 17/21
1023780 12/1952 France ........................................ 17/21

Primary Examiner—Willie G. Abercrombie
Attorney, Agent, or Firm—Wood, Herron & Evans

[57] ABSTRACT

A dehider having a novel housing and blade gear assembly and a novel bearing and blade grease system. The novel housing and blade gear assembly permits the dehider's head to be easily disassembled and reassembled for blade changing or sharpening purposes while insuring alignment of the dehider's dual blades upon reassembly. The dehider's novel bearing and blade grease system allows the dehider's bearings to be greased from exterior of the dehider's head, and allows the cavity between the hollow ground dual blades to be provided with grease interiorly thereof also from exterior of the head, i.e., without disassembly of the dehider's head.

23 Claims, 8 Drawing Figures

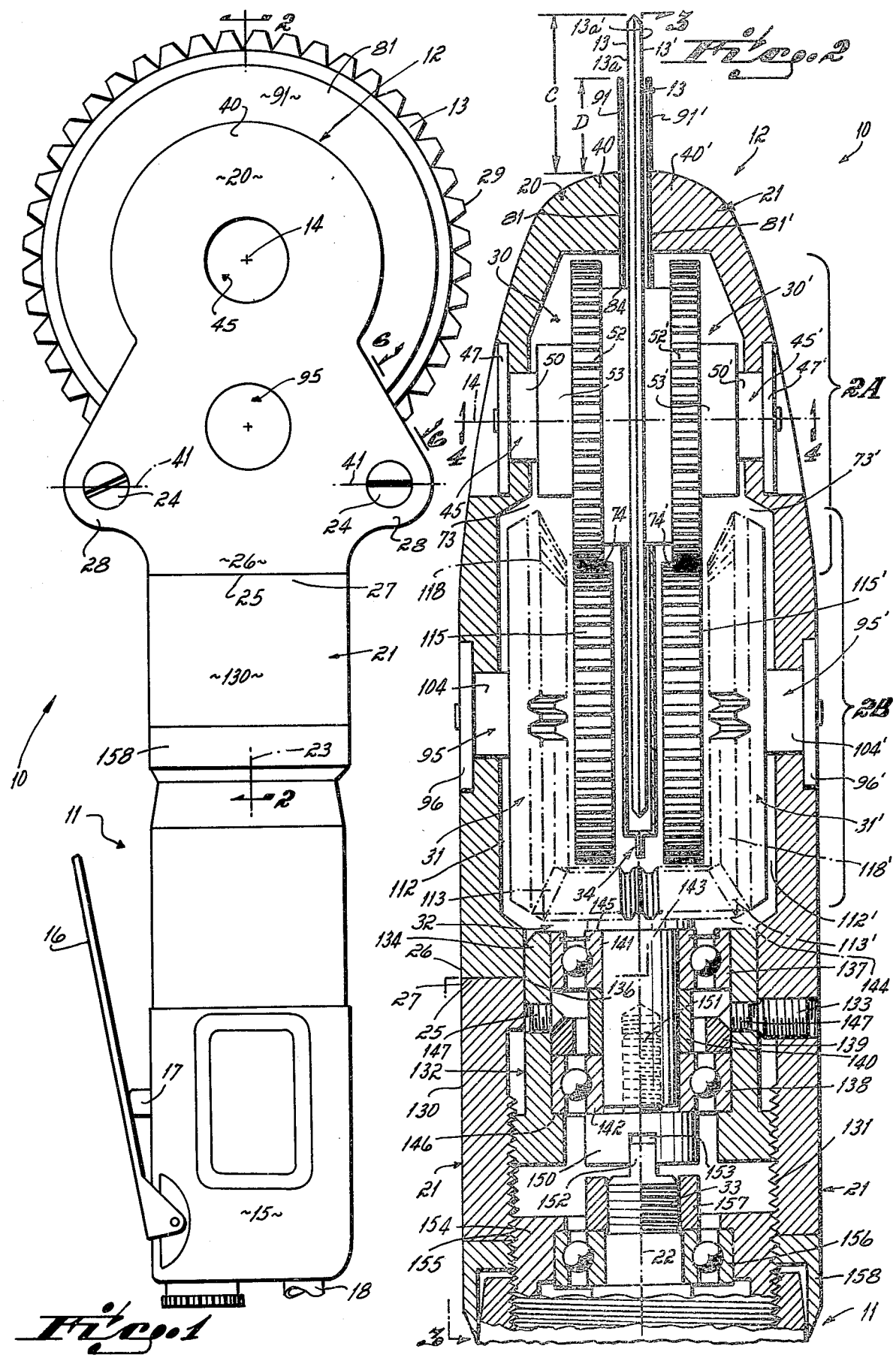

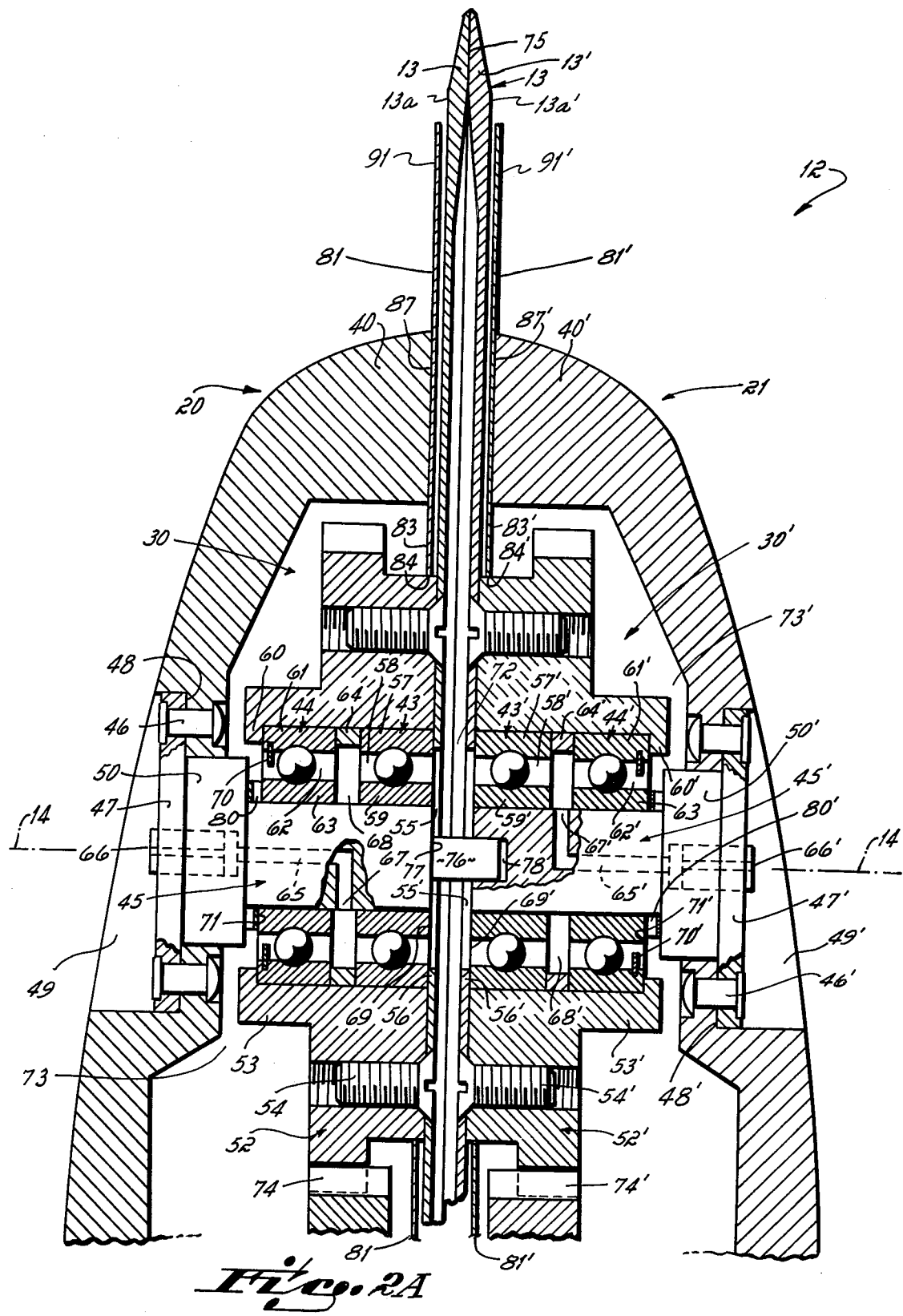

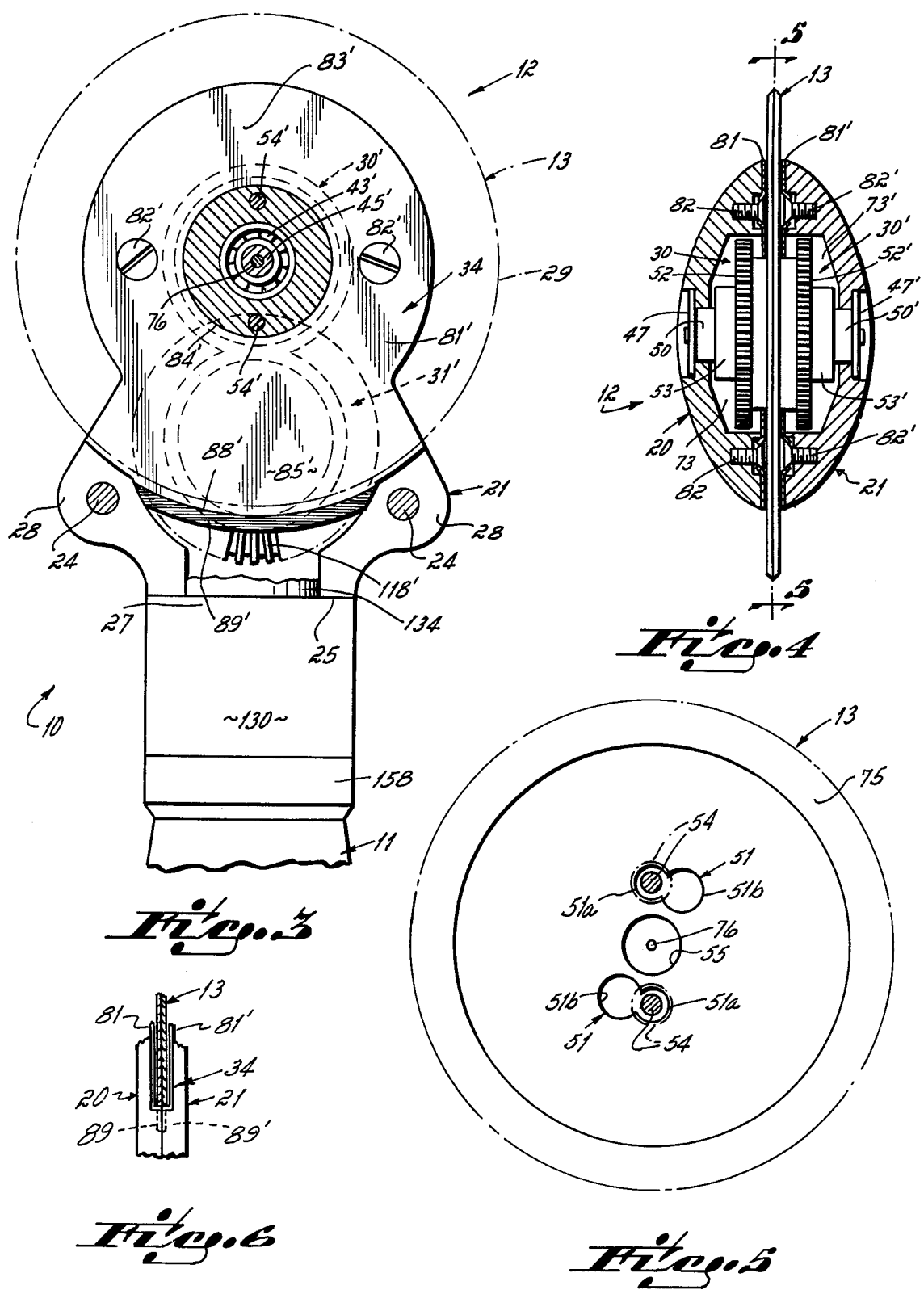

DEHIDER

This invention relates to dehiders or flaying tools. More particularly, this invention relates to a dehider of the double blade type.

Dehiders are very well known in the meat processing industry, and have been used in commercial use for years. The function of a dehider, also known as a flaying tool, is to aid an operator in removing the hide from the carcass of animals, e.g., cattle. Such animal hides are valuable, and it is highly desirable to effect removal without injuring the hides so as not to reduce their value. Historically, hides were removed from animal carcasses with a manually operated straight knife. However, and more recently, the dehider or flaying tool was developed to improve the unit output or work efficiency of the operator as an aid in removing the animal hide from the animal carcass.

The typical dehider known to the prior art incorporates two blades coaxially aligned relative one with the other, each having a series of teeth on a common tooth diameter. The two blades lie flush against one another, and are subjected to countermotion, whether rotation or oscillation, so as to provide a cutting type action as the teeth of one blade move relative to the teeth of the other blade. The counter motion blades are carried in a hand tool type housing, and are powered by a fluid motor and gear train also carried in that housing. The fluid motor may be in the nature of a pneumatic motor, for example, connected with an air pressure source, and controlled by a trigger on the housing's hand section. Typical of dehider tools known to the prior art are those illustrated in Logan U.S. Pat. No. 3,165,833, entitled "Flaying Tool", issued Jan. 19, 1965 and Eichenberg U.S. Pat. No. 3,277,572, entitled "Hide Removing Apparatus", issued Oct. 11, 1966.

One of the problems inherent in dehider or flaying tools of the prior art has been the problem of re-establishing and maintaining alignment of the two blades on a common axis upon reassembly and use of the dehider's head. The head must be periodically disassembled during commercial use for the purpose of re-sharpening or replacing of the blades. The housing and blade gear assemblies known to the prior art, however, tend to wear after a limited period of use, and, thereby, cause axis alignment problems of the two counter-motion blades after repeated disassembly and reassembly of the dehider head. This wear problem may also result in play within the blade gear assemblies during use of the dehider, and in turn this may cause malfunctioning of the dehider when it is exposed to substantial in-use stress or strain forces. It has, therefore, been one objective of this invention to provide a unique and novel head for a dehider or flaying tool that overcomes these problems and which is easily used by an operator.

Another problem associated with dehider or flaying tools of the prior art is that of introducing grease into the drive gear assembly's bearings, and into the cavity defined by the two juxtoposed hollow ground counter-motion blades. The greasing systems for dehiders of the prior art have been relatively difficult to use, and in some structures have been required disassembly of the dehider's head to introduce grease between the blades and/or into the head's gear train. Accordingly, it has been a further objective of this invention to provide a unique bearing and blade greasing system for a dehider or flaying tool by which grease can be introduced into the blade gear assembly and into the hollow cavity defined between the two counter-motion blades, from exterior of the tool's head without disassembly of that head.

Other objectives and advantages of this invention will be more apparent from the following detailed description, taken in conjunction with the drawings in which:

FIG. 1 is a side elevational view illustrating a dehider or flaying tool structured in accord with the principles of this invention;

FIG. 2 is a cross-sectional view of the tool's head as taken along line 2—2 of FIG. 1;

FIGS. 2A and 2B are enlarged cross-sectional views of the upper blade gear assemblies and the mating double gear assemblies, respectively, as indicated by the brackets 2A and 2B on FIG. 2;

FIG. 3 is a cross-sectional view of the tool's head taken along line 3—3 of FIG. 2;

FIG. 4 is a cross-sectional view of the tool's head taken along line 4—4 of FIG. 2;

FIG. 5 is a cross-sectional view of the tool's head taken along line 5—5 of FIG. 4; and FIG. 6 is an end view of the tool's head taken along line 6—6 of FIG. 1.

Figure 2B:
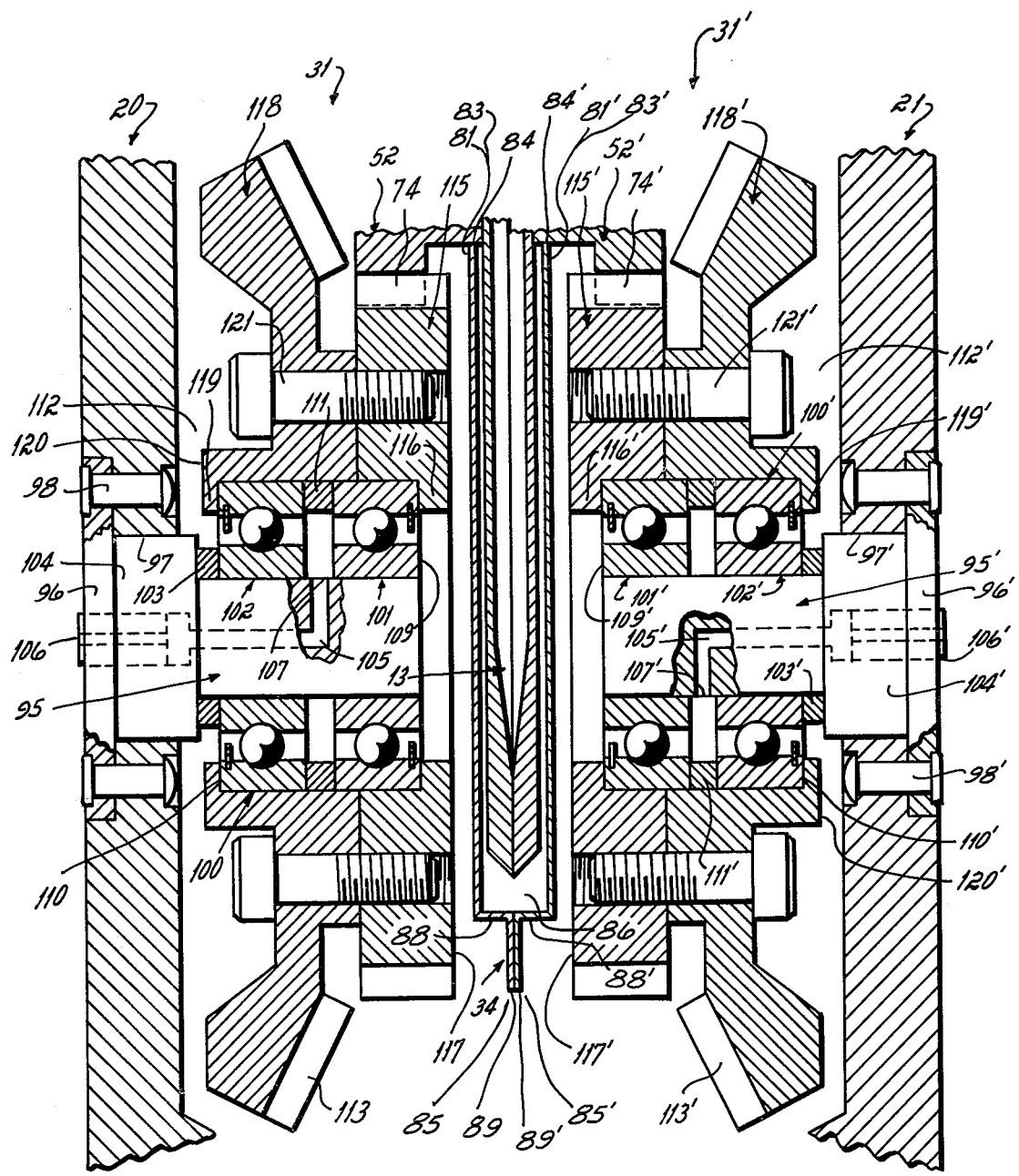

A dehider or flaying tool 10 structured in accord with the principles of this invention is illustrated in side elevational view in FIG. 1. As shown in that figure, the tool 10 basically is comprised of an air motor assembly 11 and a head 12 attached thereto. The head 12 carries two counter-rotating blades 13, 13' on a common blade axis 14. The air motor assembly 11 includes a housing 15 which functions, in use, as the tool's handle. The air motor assembly 11 also includes a trigger 16 cooperable with on/off switch plunger 16 which controls activation and deactivation of the air motor interiorly of the handle 14 and, thereby, which controls counter-rotation of the tool's blades 13, 13'. The air motor assembly 11 is connected with an air pressure source, not shown, by hose 18. The air motor assembly 11 is known to the prior art and readily available in commerce. The air motor assembly 11, per se, forms no part of this invention.

The dehider's head is particularly illustrated in FIGS. 2-5. As shown in FIG. 2, the head 12 is basically comprised of a left-hand housing 20 and a right-hand housing 21 generally symmetrically disposed relative to tool center plane 22, the center plane being parallel to and in between the tool's blades 13, 13'. The head plane 22 also includes the center axis 23 of the tool 10, see FIG. 1. In connection with this symmetry, corresponding parts in the head's right-hand half 21 and corresponding parts in the head's left-hand half 20 are given identical reference numerals which differ only by a prime mark designation. Different parts in the right and left-hand head halves are provided with different reference numerals.

The tool's head 12 includes, as mentioned, left-hand housing 20 and right-hand housing 21, the two housings being illustrated in FIGS. 1 and 2, and being held together by housing bolts 24 located on opposite sides of the tool's center axis 23 and adjacent the separation line 25 of the housings. Note particularly the left housing 20 incorporates a bottom edge or heel section 26 disposed transverse to the tool's axis 23, that heel 26 being configured and sized to seal against a top edge or foot section 27 of the right housing 21. Both the right 21 and left 20 housings are provided with ears 28 positioned beyond the blades' periphery 29 through which housing bolts 24 are received in connected relation. The housing bolts 24 prevent axial separation (relative to blades' rotation axis 14) of the left housing 20 from the right housing 21, and the housing bolts 24 and heel 26-foot 27 housing structure prevent axial separation (relative to the tool's longitudinal axis 23), during use of the tool.

The tool's left housing 20 includes a blade gear assembly 30 to which is affixed the left-hand blade 13, and a double gear assembly 31. The double gear assembly 31 connects the blade's drive gear assembly 30 with a pinion gear assembly 32 carried in the right housing 21. The tool's right housing 21 includes a blade gear assembly 30' to which is affixed the right blade 13', and a double gear assembly 31' drivingly engaged with the blade gear assembly 30'. The double gear assembly 31' also connects with the pinion gear assembly 32, which is mounted in the right housing 21. The pinion gear asembly 32 is driven by motor shaft 33 of the tool's air motor 11. When assembled, the blade gear assemblies 30, 30', the double gear assemblies 31, 31', and the pinion gear assembly 32 are protected from the introduction of foreign matter through counter-rotation of the hollow ground blades 13, 13' by a two part gear shield 34 partially carried by the left housing 20 and partially carried by the right housing 21.

With specific reference to the blade's housings 20, 21, the left housing 20 includes nose 40 within which blades 13, 13' are coaxially mounted. The heel 26 is seated flush against the foot 27 defined by the right housing 21 when the left and right housings are assembled by housing bolts 24 so as to prevent relative rotation or swinging movement of the left housing relative to the right housing on blade axis 14 such as might be induced during use by the forces generated in the various gear assemblies. The housing's heel 26 and foot 27 cooperate in this regard with the housing bolts 24. Note also the force line 41 of housing bolts 24 is adjacent the gear interface between the pinion gear assembly 32 and the double gear assemblies 31, 31', is normal to the tool's axis 23, and is, therefore, substantially removed from the dual blade axis 14. This permits easy disassembly and reassembly of the tool's head 12, insures significant compressive force on the head at the gear interface between the primary gear assembly 32 and the double gear assemblies 31, 31' to maintain meshing engagement of those assemblies during use, and removes undue compressive force at the head's nose 40 so that blades 13, 13' are not unduly loaded on against the other.

The left housing 20 includes blade gear assembly 30, the left blade 13 being rotatably mounted or carried on that blade gear assembly. The blade gear assembly 30 includes blade shaft 45 permanently or immobily fixed by rivets 46 to the left housing 20. The blade shaft 45 includes head plate 47 seated in a seat 48 defined by bore 49 counter-sunk in th exterior face of the left housing 20 to locate and maintain the shaft 45 in fixed position relative to the housing 20. Abutment collar 50 is formed integral with the head plate 47 and blade shaft 45. The bearing shaft 45 rotatably carries the left blade 13 through use of inner 43 and outer 44 bearings, and a blade drive gear 52 formed integral with a hub or spacer sleeve 53. The left blade 13 is fixed to the spacer sleeve 53 by flat head screws 54, the blade being thereby spaced from the drive gear 52 a width equal to the width of the spacer sleeve. As shown in FIG. 5, the flat head screws 54 cooperate with arcuate bayonet type slots 51 in the blade 13, the slots 51 each having a minor diameter section 51a of lesser diameter than the diameter of the screws' flat heads and a major diameter section 51b of greater diameter than the diameter of the screws' flat heads. Note particularly that the blade 13 also includes an axial hole 55 sized so that inner peripheral edge portion 56 overlies the outer race 57 of the inner bearing 43, but does not close off the space 58 between outer race 57 and inner race 59 of that inner bearing 43. The outer bearing 44 is seated against annular flange 60 formed integral with the drive gear 52/spacer sleeve 53 unit, the flange 60 overlying the outer race 61 of the outer bearings 44 but not closing off the spacer 62 between outer race 61 and inner race 63 of that outer bearing 44. Thus, the inner 43 and outer 44 bearings, which are separated by bearing spacer 64, are held in position relative one to another and relative to the blade drive gear 52 and blade 13, within the drive gear assembly 30 because they are trapped between the blade's inner peripheral edge portion 56 and the annular flange 60.

The left housing's blade shaft 45 also includes a generally axially disposed grease bore 65 which terminates at its outer end at the head plate 47 in a grease fitting 66 adapted to inter-connect with a grease gun (not shown). The inner end 67 of the grease bore 65 exhausts between the inner 59, 63 races of inner 43 and outer 44 bearings in that space 68 established by the bearing spacer 64, thereby providing a continuous grease bore from the exterior face of the left housing 20 into the race interior between the blade's inner 43 and outer 44 bearings. Note there is no shield or seal at the inner face 69 of the inner bearing 43, and that there is a partial shield 70 but no seal at the outer face 71 of the outer bearing 44. This allows grease introduced through grease bore 65 to flow from between the inner bearings' races 57, 59 into the hollow cavity 72 defined by the blades 13, 13' through axial port 55 in the left blade 13, and also allows grease to flow from between the outer bearings' races 61, 63 past the shield 70 into the left housing cavity 73 so as to aid in providing grease to the gear interface 74 between the double gear assembly 31 and the blade gear assembly 30. Of course, because of the total lack of resistance to grease flow at the inner face 69 of the inner bearing 43 relative to the partial resistance to grease flow through use of partial shield 70 at the outer face 71 of the outer bearing 44, significantly more grease flows into the hollow blade cavity 72 defined by the juxtaposed blades 13, 13' than into the housing cavity 72 defined by the juxtaposed blades 13, 13' than into the housing cavity 73 adjacent the double gear assembly 31-blade gear assembly 30 interface 74. This is desirable because it is desirable during use of the tool 10 to maintain a significant grease supply in the hollow cavity 72 between blades 13, 13' to insure proper greasing of the blades at their contact interface 75 at the peripheral edges 29, 29' thereof.

The blade shaft 45 fixed to the left housing 20 also includes a pin 76 that extends outwardly from the inner end 77 thereof across the head plane 22 of the tool 10. This pin 76 cooperates with alignment bore 78 in the blade shaft 45' fixed to the right housing 21 so as to permit easy and simple re-alignment, and to insure that re-alignment, of the blades 13, 13' relative one to another when the left and right housings are reassembled. This pin 76 and bore 78 connection between housings 20, 21 adjacent noses 40, 40' thereof is to insure proper axial alignment between blades 13, 13' and is not a fixed connection. This is desirable because it is preferred to spring load the blades 13, 13' one against the other. This spring loading is established by waffled or corrugated washer type springs 80, 80' interposed between each housing's outer bearings 44, 44' and support collar 50, 50' of each blade shaft 45, 45'. These waffled or corrugated springs 80, 80' continuously spring load the blades 13, 13' towards one another at blade interface 75 when the left housing 20 and right housing 21 are assembled as shown in FIG. 2, and regardless of wear at that interface 75, thereby maintaining blade 13, 13' contact at the interface. Note particularly that the springs 80, 80' are not subject to wear since no part rotates thereagainst.

The gear shield 34 for the blades 13, 13' is comprised of a left shield 81 and a right shield 81', these shields being fixed to housings 20, 21 by flat head shield screws 82, see FIGS. 2-4. The shield 81 is provided with a center plate section 83 of generally circular configuration adapted to protect the blade gear assembly 30 from foreign material drawn into the head 10 due to counter-rotation cutting action of the blades 13, 13'. This generally circular center section 83 has bore 84 axially aligned with the blade's rotation axis 14, and adapted to interfit with the outer periphery of blade gear assembly's rotating spacer sleeve 53, thereby providing a slip-fit (as mounted) between the stationary left shield 81 and the rotating blade drive gear 52 and blade 13 during use. The left shield 81 also includes a fan shaped bottom section 85, as shown in FIG. 3, which extends downwardly toward the tool's handle 11 so as to protect the double gear assembly 31 from foreign material carried into the shield cavity 86 by the counter-rotating double blades 13, 13'. The left shield 81 is seated against inner face 87 of the housing 20, and is turned peripherally inward at its bottom edge 88 to provide an exterior flange 89. The exterior flange 89 of the left shield 81 mates with the exterior flange 89' of the right shield 81' in a spring loaded type relation (due to the inherent spring nature of the metal plate from which the shield 34 is formed) so as to insure a seal therebetween at the shield's bottom edges 88, 88', see FIG. 2B. This arcuate bottom edge 88, 88' of the cooperating left 81 and right 81' shields prevents foreign matter introduced into the shield cavity 86 from being transmitted into the tool's pinion gear assembly 32. Thus, the left 81 and right 81' shields are in sealed relation with the housings 20, 21 because they are fixed to the inner faces 87, 87' of the left 20 and right 21 housings, respectively, because they present axial bores 84 through which the drive gear assemblies' spacer sleeves 53, 53' extend, and because they establish a spring loaded type seal at bottom edge 88, 88' through use of flanges 89, 89', the shields 81, 81' thereby cooperating to prevent introduction of foreign matter into any of the blade gear assemblies 30, 30', double gear assemblies 31, 31' or pinion gear assembly 32, such as might be carried thereinto by the counter-rotating double blades 13, 13'.

Each gear shield section 81, 81' also extends outwardly a distance D substantially beyond nose 40, 40' of its related housing 20, 21 to a position which is proximate to, but does not overlie, teeth 29 of the blades 13, 13'. This extended or arcuate exposed section 91, 91' of the shield permits the dehider to achieve a deep cut C from the periphery of the blades 13, 13' to the radially outermost edge of the housings' nose sections 40, 40' while preventing significant surface contact of the blades' outside surfaces 13a, 13a+ with, e.g., a carcass being dehided. Substantial contact of the blades' exposed surfaces 13a, 13a' with a carcass tends to result in significant torque forces on the dehider 10 which, in turn, tends to twist the dehider in the operator's hand during use.

The double gear assembly 31 includes spur 115 which is provided with a peripheral flange 116 adjacent the inner face 117 thereof, and bevel gear 118 which is provided with a peripheral flange 119 adjacent the outer face 120 thereof. The spur gear 115 and bevel gear 118 are connected one to another by bolts 121. The double gear assembly 31 includes immobile or fixed shaft 95 on which the double gears 115, 118 are rotatably carried. This double gear shaft 95 is similar to the blade gear assembly's shaft 45 in that it includes a head plate 96 counter-sunk in bore 97 of the exterior face of the left housing 20, and is attached thereto by rivets 98. The double gear shaft 95 receives an inner bearing 101 and outer bearing 102 in seated relation, shim 103 separating the outer bearing and the shaft's collar 104 on the double gear shaft.

The gears 115, 118, when connected, define a seat 100 between the inner 116 and outer 119 flanges within which bearings 101, 102 are received so as to fixedly locate the bearings with the combined transfer gear 115 and bevel gear 118. Spacer 111 separates the bearings 101, 102 one from the other in double gear seat 100, and shim 103 separates the bearings 101, 102 from the shaft's collar 104.

The double gear shaft 95 also includes a grease bore 105 that terminates at head plate 96 in grease gun fitting 106, and that terminates in port 107 at the spacer 111 between bearings 101, 102. The inner bearing 101 and outer bearing 102 are provided with partial shields, and not seals, at their inner face 109, and outer face 110, respectively, so that grease introduced into the bearings at port 107 midway therebetween (the bearings being separated by bearing spacer 111) can exhaust from the inside face 109 of the inner bearing 101 and the outside face 110 of the outside bearing 102. Grease so exhausted into the housing cavity area 112 aids in lubricating the gear interface 113 between pinion gear assembly 32 and bevel gear assembly 31, as well as aids in lubricating the gear interface 74 between blade gear assembly 30 and transfer gear assembly 31.

The left blade gear assembly 30, left double gear assembly 31, left blade gear shield 81, and left blade 13, as described in the paragraphs immediately above, all as connected to the left housing 20, are all removed from assembled relation with the rest of the dehider's head 12 when housing bolts 24 which interconnect the left 20 and right 21 housings are removed. This housing assembly exposes the left 13 and right 13' blades to easy removal by an operator for sharpening or replacement simply by turning flat head screws 54 or 54' a one-half turn relative to the blade gear assembly 30 or 30'. In this regard, and with flat head screws 54 or 54' turned one-half turn or so, the blades 13 or 13' can simply be pivoted on each's rotation axis 14, 14' until the screws' heads overlie the bayonet slots' major diameter sections 51b, 51b', the blades then being lifted axially away from the blade gear assembly 30 or 30' in order to achieve simple and easy disassembly. Reassembly of blades 13, 13' is achieved in reverse fashion with the blades being turned or pivoted until the bayonet slots' minor diameter sections 51a, 51a' underlie the screws' heads with the screws 54, 54' thereafter being tightened. Therefore, and to remove or install blades 13, 13' with the blade gear assembly 30, 30', the screws 54, 54' do not have to be removed from connected relation with blade drive gears 52, 52', merely loosened. Further, it will be understood that if access to the blade gear assembly 30 or 30' or bevel gear assembly 31 or 31' is required, once the left housing 20 is removed from assembled relation with the right housing 21 it is only necessary to remove the blade 13 or 13' as described, as well as simply lift off the blade shield 81 or 81' after removal of flat head scews 82 which connect the blade shield with the housings. This simplicity aids in maintenance or replacement of gear assembly 30, 30', 31, 31' parts within the housings.

The right housing 21 of the dehider tool 10, in connection with the right blade 13', the right gear shield 81', the right bevel gear assembly 31', is substantially the same as the counterpart parts component in the left housing. The only difference in these right component parts from the corresponding left component parts is in their mirror relationship relative to the head plane 22 of the dehider tool 10, and in the structure of the blade bearing shafts 45, 45'. As earlier mentioned, right hand parts identical to left hand parts are denoted with a common reference in number but with a prime. The bearing shaft 45' in the right housing 21, as earlier mentioned, includes a bore 78 in the inner face end thereof for receipt of alignment pin 76 formed in the inner face end of the left hand bearing shaft 45. The grease system for the blade gear assembly 30, 30' and the double gear assembly 31, 31', and for the cavity 72 between hollow ground blades 13, 13', is the same in both left 20 and right 21 housings.

The right housing 21 significantly differs from the left housing 20, however, in that the right housing also is provided with structure by which pinion gear assembly 32 is located and maintained in operative relation with the double gear assemblies 31, 31'. In this regard, the right housing 21 is provided with a tubular sleeve 130 at the bottom end thereof, the sleeve being threaded as at 131 at the lower end and being provided with seat 136 on one side thereof at the upper end or foot section 27 (described earlier). The sleeve 130 is sized to receive a pinion cartridge 132 in threaded relation, the location of that pinion cartridge within the sleeve being originated and maintained by set screw 133 which, in effect, aligns the pinion assembly 32 in the desired axial location relative to the longitudinal axis 23 of the tool. The non-threaded end 134 of the pinion cartridge 132 also cooperates with the housing sleeve 130 to define the arcuate seat 136 of right angular cross-section for the foot 26 of the left housing 20. Further, the pinion cartridge 132, which in effect is fixed to the right housing 21 because of its threaded relation therewith, cooperates with the foot of the left housing 20 to aid in alignment of housings 20, 21 so that the blade gear assembly 30, 30', double gear assemblies 31, 31', and pinion gear assembly 32 are all aligned upon assembly of the housings and use of the tool 10 since this structural relation also prevents pivoting of one housing 20 relative to the other housing 21 after assembly thereof. The pinion cartridge 132 is structured to receive upper 137 and lower 138 bearings therein, the bearings being separate one from the other by outer spacer collar 139 and by inner spacer collar 140. The inner races 141, 142 of the upper 137 and lower 138 bearings, and the inner spacer collar 140, are seated on the shaft 143 of pinion gear 144. The upper bearing 137 is received on seat 145 in that pinion gear shaft 143, and the lower 138 bearing is received on seat 146 in the pinion cartridge 132, the set screws 147 retaining the assembly in fixed structural relation. The pinion gear 144 rotates on longitudinal axis 23 of the dehider tool 10.

The pinion gear 144 is connected with the motor drive shaft 33 by adapter 150 threaded as at 151, into the lower end of the pinion gear shaft 143. The motor drive shaft 33 presents a screw-driver like blade 152 received in a cross slot 153 in the adapter 150. The motor drive shaft 33 is aligned with the upper end of the air motor housing 11 by alignment collar 154 threadedly received therein as at 155. A bearing 156 is interposed between that motor shaft 33 and that alignment collar 154, the bearing being secured to the shaft 33 by a lock nut 157. The alignment collar 154 also is threadedly received with the right housing's sleeve 130, and outer collar 156 is provided as a lock collar 158 to retain the air motor 11 in assembly with the tool's head 12.

In use of the dehider tool 10, and upon assembly, rotation of the pneumatic motor's drive shaft 33 causes the pinion gear 144 to similarly rotate. Rotation of the pinion gear 144 induces rotation in one direction of one double gear 115, 118 through interface 113 with the bevel gear 118, and induces rotation in the opposite direction of the other double gear 115', 118' through interface 113' with bevel gear 118'. Rotation of the double gear 115, 118 in that one direction induces rotation of the blade gear 52 (and, hence, of the blade 13) in the other direction, and rotation of the double gear 115', 118' in the other direction induces rotation of the blade gear 52' (and, hence, of the blade 13') in the opposite direction. Thus, the opposed right 13' and left 13 blades are rotated in opposite directions upon rotation, in a singular direction, of pinion gear 144. Operation of the fluid motor 11 (not shown in detail) and, therefore, counter-rotation of the two blades 13, 13', is controlled through use of trigger 16 by an operator holding the dehider tool in one hand by its handle.

Having described in detail the preferred embodiment of my invention, what I desire to claim and protect by Letters Patent is:

1. A flaying tool having two blades in contact with one another, said blades being movable relative one to the other on a common blade axis, said tool comprising
   a first housing and a second housing
   a first blade gear shaft and a second blade gear shaft, one of said blades being mounted on said first shaft and the other of said blades being mounted on said second shaft, said first shaft being fixed to said first housing and said second shaft being fixed to said second housing,
   first bearings between said blade and said first shaft and second bearings between said second blade and said second shaft, and
   a grease system for at least one of said shafts, said system comprising a bore in said shaft, the exterior end of said bore being connectable with a grease injecting apparatus exterior of said housing, and the inner end of said bore being connected to said bearings and an interior cavity defined between two blades so that grease injected into said shaft's bore supplies grease for said bearings and for said interior cavity.

2. A flaying tool as set forth in claim 1, the inner end of said bore being connected to one of said bearings for connecting said one bearings to said interior cavity, said bore permitting grease to be directly injected into said bearings and exhausted from said bearings into said interior cavity.

3. A flaying tool as set forth in claim 2, said tool comprising
   a separate grease system for each of said shafts.

4. A flaying tool as set forth in claim 2, one of said blades comprising a port coaxially disposed relative to said blade's periphery, said port being of a larger diameter than the diameter of said shaft on which said blade is mounted, said blade's inner periphery cooperating with the outer race of said one bearings to provide an annular exhaust port defined by the inner and outer races of said bearings into said interior cavity defined by said blades.

5. A flaying tool as set forth in claim 2, said one bearings comprising an inner bearing and an outer bearing on said shaft, said inner and outer bearings being spaced one from another, and said bore in said shaft opening into said inner and outer bearings in the space defined therebetween.

6. A flaying tool as set forth in claim 1, said tool comprising a connector connecting said blade to its respective shaft, said connector being operable to release each blade to its respective shaft without removing said connector from connected relation with that shaft.

7. A flaying tool having two circular blades mounted on a common axis, said blades being in contact one with another during relative motion therebetween, said tool comprising a left housing and a right housing, a left blade gear assembly connected to said left housing and a right gear assembly connected to said right housing, one of said blades being connected with said left assembly and one of said blades being connected with said right assembly, said gear assemblies being separate one from the other, an alignment pin coaxially aligned with one blade and connected to that one of said blade gear assemblies for said one blade, structure defining a bore coaxially aligned with the other blade and connected to that other of said blade gear assemblies for said other blade, said pin and said bore being received in assembled relation to maintain coaxial alignment of said blades upon assembly of said left and right housings, but not preventing axial disassembly of said housings, and connector means for connecting said left and right housings in assembled relation, said connector means being located beyond the periphery of said circular blades and not being coaxially aligned with said blades.

8. A flaying tool as set forth in claim 7, said connector means comprising at least one bolt structured to immobily connect said left and right housings, said bolt being located beyond the periphery of said blades.

9. A flaying tool as set forth in claim 8, said connector means comprising at least two bolts, said bolts being disposed on a bolt line generally perpendicular to the axis of said tool.

10. A flaying tool as set forth in claim 7, said connector means comprising a sleeve integral with one of said housings, said sleeve defining a foot section having a first abutment surface, and a heel section integral with the other of said housings, said heel section having a second abutment surface adapted to cooperate with said first abutment surface when said housings are assembled for preventing swinging motion of one housing relative to the other about said blade axis.

11. A flaying tool as set forth in claim 10, said abutment surfaces being disposed generally perpendicular to the axis of said tool.

12. A flaying tool as set forth in claim 7, said tool further comprising spring means interposed between at least one of said gear assemblies and its respective housing, said spring means functioning to spring bias said blades into contact one with another during use of said tool.

13. A flaying tool as set forth in claim 12, said spring means being in the nature of a corrugated spring washer.

14. A flaying tool as set forth in claim 12, each of said blade gear assemblies comprising a blade gear shaft fixed to said housing, a blade drive gear fixed to said blade, and bearings between said drive gear and said shaft, said bearings being slidable relative to said shaft, thereby permitting easy disassembly of said drive gear and blade from said housing.

15. A flaying tool as set forth in claim 14, each of said blade gear assemblies comprising a connector connecting said blade to said blade drive gear, said connector being operable to release said blade from its blade drive gear without removing said connector from connected relation with that blade drive gear.

16. A flaying tool having first and second blades in contact with one another, said blades being movable relative one to the other on a common blade axis, said tool comprising a left housing and a right housing, said housings being assembled one with the other to establish a head within which said blades are carried, a first blade gear connected to said first blade and a second blade gear connected to said second blade, each of said drive gears being spaced from its respective blade by a spacer sleeve, a first gear shield interposed between said first blade gear and said first blade, and a second gear shield interposed between said second blade gear and said second blade, each of said blade shields being immobilized relative to said housing, each of said blade shields defining a port adapted to cooperate with a related spacer sleeve for preventing significant flow of foreign matter therebetween, and each of said blade shields including a flange at the inner ends thereof adapted to cooperate one with the other to establish a sealed cavity within which said blades move when said tool is assembled, said shields cooperating to prevent significant flow of foreign matter in the blade cavity as defined by said shields from flowing into the housing cavity as defined by said housings.

17. A flaying tool as set forth in claim 16, each of said flanges being outwardly directed relative to the periphery of said blades.

18. A flaying tool as set forth in claim 16, said tool further comprising first and second blade gear assemblies, said first blade gear assembly incorporating said first blade gear and being mounted on one of said housings, and said second blade gear assembly incorporating said second blade gear and being mounted on the other of said housings, first and second double gear assemblies, said first double gear assembly being connected to one of said housings and said second double gear assembly being connected to the other of said housings, and a pinion gear assembly connected to one of said left and right housings, said blade gear assembly, said double gear assembly and said pinion gear assembly all being disposed in said housing cavity as defined by said housings and, thereby, protected against significant flow of foreign matter that may be in the blade cavity from entering into said housing cavity.

19. A flaying tool as set forth in claim 17, said tool further comprising spring means interposed between at least one of said blades and its respective housing, said spring means continuously biasing said blades into contact one with the other, the width of said spacer sleeve permitting relative motion between its associated shield and its associated blade in response to said spring means.

20. A flaying tool as set forth in claim 19, each set of blade, blade gear, and spacer sleeve being immobily connected one with the other, said tool further comprising a first blade gear shaft and a second blade gear shaft, one of said blades being mounted on said first shaft and the other of said blades being mounted on said second shaft, said first shaft being fixed to said left housing and said second shaft being fixed to said right housing, and first bearings between said first blade and said first shaft and second bearings between said second blade and said second shaft, said bearings being slidably received on said shaft, thereby permitting relative axial motion between said shaft and said blade in response to said spring means.

21. A flaying tool as set forth in claim 16, said tool further comprising connector means for connecting said first and second gear shields in assembled relation with said left and right housings, respectively, said connector means immobily fixing each of said shields to its respective housing.

22. A flaying tool as set forth in claim 21, said connector means comprising at least one screw by which said shield is fixed to its respective housing.

23. A flaying tool as set forth in claim 16, said tool comprising a connector connecting said blade to said blade gear, said connector being operable to release said blade from its blade gear without removing said connector from connected relation with that blade gear.

* * * * *

UNITED STATES PATENT AND TRADEMARK OFFICE
CERTIFICATE OF CORRECTION

PATENT NO. : 4,215,451
DATED : August 5, 1980
INVENTOR(S) : Mark W. Wikoff

It is certified that error appears in the above-identified patent and that said Letters Patent are hereby corrected as shown below:

Column 1, line 63, change "have been" to --has even--.

Column 2, line 44, insert --12-- after the word "head".

Column 2, line 65, change "seal" to --seat--.

Column 3, line 55, change "th" to --the--.

Column 4, line 12, change "spacer" to --space--.

Column 5, line 65, change "13a+" to --13a'--.

Column 8, line 48, insert --first-- before the word "blade".

Signed and Sealed this

Ninth Day of December 1980

[SEAL]

Attest:

Attesting Officer

SIDNEY A. DIAMOND

*Commissioner of Patents and Trademarks*